(12) United States Patent
Poddey et al.

(10) Patent No.: US 11,226,825 B2
(45) Date of Patent: Jan. 18, 2022

(54) DYNAMIC ASSIGNMENT OF SPECIAL TASKS IN DISTRIBUTED NETWORKS

(71) Applicant: Robert Bosch GmbH, Stuttgart (DE)

(72) Inventors: Alexander Poddey, Wiernsheim (DE); Fredrik Kamphuis, Leonberg (DE); Nik Scharmann, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/020,470

(22) Filed: Sep. 14, 2020

(65) Prior Publication Data

US 2021/0089320 A1    Mar. 25, 2021

(30) Foreign Application Priority Data

Sep. 19, 2019    (DE) .......................... 102019214255.9

(51) Int. Cl.

| | |
|---|---|
| *G06F 9/38* | (2018.01) |
| *H04L 29/08* | (2006.01) |
| *G06F 9/30* | (2018.01) |

(52) U.S. Cl.
CPC .......... *G06F 9/3851* (2013.01); *G06F 9/3012* (2013.01); *H04L 67/1097* (2013.01)

(58) Field of Classification Search
CPC ... H04L 67/1097; G06F 9/3012; G06F 9/3851
See application file for complete search history.

(56) References Cited

U.S. PATENT DOCUMENTS

| | | | |
|---|---|---|---|
| 9,875,510 B1 | 1/2018 | Kasper | |
| 2007/0094323 A1* | 4/2007 | Smith | H04L 12/66 709/202 |
| 2011/0047554 A1* | 2/2011 | Lakshmanan | G06F 9/505 718/105 |
| 2018/0198794 A1* | 7/2018 | Huh | H04L 9/0637 |
| 2018/0300694 A1 | 10/2018 | Duan et al. | |
| 2019/0004858 A1* | 1/2019 | Bernat | H04L 67/1097 |

(Continued)

OTHER PUBLICATIONS

Do, et al.: "Delegated Proof of Reputation: a Novel Blockchain Consensus", In: 2019 International Electronics Communication Conference (IECC'19), Okinawa, Japan, Jul. 7-9, 2019, pp. 90-98.

(Continued)

*Primary Examiner* — Zachary K Huson
(74) *Attorney, Agent, or Firm* — Norton Rose Fulbright US LLP; Gerard Messina

(57) ABSTRACT

A method for operating a network, a proper subset of the nodes carrying out at least one special task. The method includes assigning a weight to each node, each node having the option as a donor node to conditionally or unconditionally delegate portions of its weight to recipient nodes. Based on the weight of each node, plus portions delegated to it and minus portions delegated by it, the proper subset of the nodes is selected, based on at least one predefined criterion. A portion of a donor node is conditionally delegated to at least two recipient nodes, under the suspending condition that the recipient node does not belong to the proper subset after the selection, and the same portion that is conditionally delegated to multiple recipient nodes is taken into account at most upon acceptance of one of these recipient nodes into the proper subset.

17 Claims, 2 Drawing Sheets

(56) References Cited

U.S. PATENT DOCUMENTS

2019/0012595 A1* 1/2019 Beser ............... H04L 9/3239
2021/0058989 A1* 2/2021 Simsek ............. H04W 40/02
2021/0073212 A1* 3/2021 Conley ............. G06F 16/27

OTHER PUBLICATIONS

Natoli, et al.: "Deconstructing Blockchains: A Comprehensive Survey on Consensus, Membership and Structure", arXiv:1908.08316[cs.DC], (2019), URL: https://arxiv.org/abs/1908.08316v1, pp. 1-43.
Salimitari, et al.: "A Survey on Consensus Protocols in Blockchain for IoT Networks", arXiv: 1809.05613v4 [cs.NI], (2019), URL: https://arxiv.org/abs/1809.05613v4, pp. 1-15.
Yang, et al.: "Delegated Proof of Stake With Downgrade: A Secure and Efficient Blockchain Consensus Algorithm With Downgrade Mechanism", IEEE Access, vol. 7 (2019), pp. 118541-118555.

* cited by examiner

DYNAMIC ASSIGNMENT OF SPECIAL TASKS IN DISTRIBUTED NETWORKS

CROSS REFERENCE

The present application claims the benefit under 35 U.S.C. § 119 of German Patent Application No. 102019214225.9 filed on Sep. 19, 2019, which is expressly incorporated herein by reference in its entirety.

FIELD

The present invention relates to distributed networks of computer-implemented nodes, in which special tasks that affect the operation of the network as a whole are to be carried out by a proper subset of the nodes.

BACKGROUND INFORMATION

Block chains are data memories that are organized as a chain of data blocks. Before being added to the block chain, each new data block is checked for compliance with a predefined set of rules, and additionally contains a cryptographic hash value of the preceding block. As a result of each subsequent change of information in a data block, at least one cryptographic hash value in the chain no longer matches the content of the block in question unless the hash values of all subsequent blocks already present are likewise adapted.

With the management of block chains, it is precisely this adaptation that is effectively prevented by distributed networks of computer-implemented nodes. In these networks, all nodes exchange the information, already present in the block chain and to be newly received, with one another and also with querying client stations. Tasks for management and continuation of the block chain, for example the addition of new blocks to the block chain, are special tasks which within the network may be assigned to a subset of nodes according to an automated consensus mechanism. A subsequent change of data in the block chain therefore requires a consensus of a majority of the nodes in the network.

The likelihood that a given node might add the next block to the block chain may be a function, for example, of a computing time spent by these nodes for the network ("proof of work").

Alternatively, this likelihood may be a function, for example, of a deposit amount with which the particular node guarantees compliance with the set of rules ("proof of stake"). Nodes may in particular be free to make contributions from their own resources to the deposit amount of another node from a predefined list ("delegation proof of stake"), or even some other arbitrary node ("unpermissioned delegation proof of stake") in order to support this node in its "candidacy" for the addition of the next block.

SUMMARY

In accordance with the present invention, a method for operating a network made up of a plurality of computer-implemented nodes is provided. In accordance with an example embodiment of the present invention, the nodes distribute information in the network among one another and exchange information with querying client stations. When the network manages a block chain, for example, the client stations with their queries may read out from the block chain, for example, information that is already present and/or file new information for storage into the block chain.

A proper subset of the nodes carries out at least one special task that influences the operation of the network as a whole. When the network manages a block chain, for example, the special task in particular may, for example, involve at least one part for creating a new block that is pending for the addition to the block chain, and/or checking the information contained in such a block for correctness with regard to a set of rules that is predefined for the block chain, and/or adding the block to the block chain when this check has a positive outcome.

For example, the information in the new block may include transactions in at least one cryptocurrency. The check for correctness may then, for example, extend to whether the transactions are signed by the particular authorized parties, and whether the same credit in cryptocurrency is not impermissibly issued multiple times. The creation of the block may include, for example,
  collecting transaction candidates from other nodes and/or from client stations,
  selecting a subset of valid transactions from same,
  forming a consistent sequence of the valid transactions which is prioritized, for example, based on a fee in the cryptocurrency which is sent with the transaction, and
  forming from this sequence a subset of possible members of the block which take into account, for example, the space requirements of individual transactions and the maximum available space in the block to be created.

Alternatively or also in combination, a block in a block chain may include at least one item to be authenticated. Examples of such items are contractual rules, time stamps, event logs of computer systems (logfiles), or also measured values that must be collected in an evidentiary form.

A weight is assigned to each node in the network. Each node has the option as a donor node to conditionally or unconditionally delegate portions of its weight to other recipient nodes. An unconditional delegation is always immediately effective, while the effectiveness of a conditional delegation may be a function of postponing or suspending conditions, and in this regard may still subsequently change.

Based on the weight of each node, plus the portions delegated to it as a recipient node and minus the portions delegated by it as a donor node to other recipient nodes, the proper subset of the nodes to which the at least one special task is assigned is selected, based on at least one predefined criterion.

This functions similarly to the above-mentioned (unpermissioned) delegation proof of stake. However, it is modified in such a way that at least a portion is conditionally delegated by a donor node to at least two recipient nodes. The delegation thus takes place under the suspending condition that the particular recipient node does not belong to the proper subset after the selection.

Thus, if the donor node intends to assist multiple various recipient nodes in the "candidacy" for acceptance into the proper subset of those nodes that perform the special task in the network, it does not have to make a decision for just one of these recipient nodes. Instead, it may provide its full assistance to all desired recipient nodes at the same time.

In this regard, the only limitation is that the same portion that is conditionally delegated to multiple recipient nodes may be taken into account at most upon acceptance of one of these recipient nodes into the proper subset. Thus, due to the conditional delegation, the amount of the portion for the final result, namely, the consensus of which nodes in the network carry out the special task, is not indefinitely duplicated.

In one illustrative example, a node A having a weight of 5, a node B having a weight of 10, and a node C having a weight of 11 are provided. Node A may now, for example, conditionally delegate a weight portion of 4 to the two nodes B and C. The following four cases may then occur with regard to nodes B and C:

Neither of nodes B and C manages to join the proper subset of the nodes, which carry out the special task. The conditional assignments of the weight portion 4 from donor node A to recipient nodes B and C are thus both ineffective, and A is thus entered with its original weight of 5 into the selection of the proper subset.

Node B is accepted into the proper subset, but node C is not. For node B, the conditionally delegated weight portion of 4 increases, and node B is entered with a total weight of 14 into the selection of the proper subset. In contrast, the conditional assignment of the same weight portion 4 to node C is ineffective, so that node C remains at its original weight of 11. Node A drops to a weight of 1 in the selection.

Node C is accepted into the proper subset, but node B is not. The situation is the opposite here: the weight portion of 4 increases for C, which lands at a total weight of 15. Node B remains at its original weight of 10, and node A drops to 1.

Both nodes B and C are accepted into the proper subset. Due to the stated limitation, in this case as well it is only possible either for node B to increase to weight 14 and node C to remain at 11, or for node C to increase to weight 15 and node B to remain at weight 10. Node A drops to weight 1 in both cases.

The example illustrates that the computation of the ultimate selection and of the ultimate weights becomes much more complicated compared to (unpermissioned) delegation proof of stake. In the broadest sense, this may be understood as a circular argument when on the one hand the weights determine which nodes are accepted into the proper subset, and on the other hand this result in turn subsequently modifies the weights on the basis of which the result has been ascertained.

However, it has been found that in exchange for this complexity, the tendency of the network to converge to a static and predictable result upon repeated reselections of the proper subset is greatly reduced. A permanent centralization of the special tasks in a few nodes is counteracted. This is very advantageous for the reliability and security of the network, in particular in conjunction with the management of a block chain.

The tendency toward centralization may be most easily understood using the example of the proof of work consensus. In this example, the intentionally progressively increasing computing time for each newly created bitcoin, in particular during the "mining" of bitcoins, which simulates the progressive scarcity of physical gold, has been accompanied by high energy consumption. Whereas the first bitcoins could still be profitably mined on the CPUs of standard PCs, making a profit is possible today only by mining with specialized hardware in professionally operated "mining farms." The most important location factor is the availability of inexpensive electrical power in the necessary quantity, so that at times, the mining has been highly concentrated in Chinese mining farms.

As the result of such a centralization, for example a combination of a few operators of mining farms may come quite close to a consensus majority in the network, thus lowering the hurdle for subsequent changes to information that is stored in a block chain. In addition, for example due to a price increase for electrical power or even a regulatory prohibition, it is possible that a major portion of the total computing capacity present in the network could fall away within a short time.

A tendency toward centralization may also result for an (unpermissioned) delegated proof of stake consensus when the prospect of remunerations (in money, for example) is offered when donor nodes delegate portions of their weight to recipient nodes, and this results in acceptance of the recipient node into the proper subset. The prospect of such remunerations provides an incentive to preferably delegate weight portions to those recipient nodes in which the likelihood is greatest that they are actually also accepted into the proper subset and the remuneration will be due.

In this context, due to the option for conditionally delegating the same weight portion to multiple recipient nodes, for example the donor node may in each case conditionally delegate the weight portion to a known, established recipient node that with a comparatively high likelihood is accepted into the proper subset, and also to a comparatively new recipient node that has a reasonable expectation for acceptance into the proper subset, although this is not certain.

The donor node may thus only increase its likelihood of obtaining a remuneration, since when the established recipient node, contrary to expectations, is not accepted into the proper subset, this provides the new recipient node with a random chance of being accepted. Conversely, in the case in which the established recipient node is accepted into the proper subset as expected, the conditional delegation to the new recipient node does not result in "loss" of the weight portion. The donor node then obtains its remuneration just from this established recipient node.

As a result, the hurdle for new nodes being accepted into the proper subset is greatly lowered overall. Thus, there is a higher likelihood that the composition of the proper subset of nodes that perform the special tasks in the network will be a balanced mixture and will change from time to time, with regard to the operator of these nodes as well as to their geographical locations. Thus, on the one hand the likelihood of a single event (such as a major power outage or a regulatory prohibition) suddenly incapacitating a major portion of the capacity of the network is reduced. On the other hand, it is less predictable which nodes will perform the special tasks and when, so that targeted manipulation attempts are hampered.

Thus, for example, the integrity assurance of information that is stored in a block chain is assisted when it is difficult to predict which node will add the next block to the block chain. Thus, an attacker who intends, through targeted manipulation, to induce this node to add a block that does not correspond to the set of rules does not know which nodes he/she must attack for this purpose.

During operation of distributed networks, incentives of any type are typically a driving force for the readiness of nodes to take over special tasks. For example, an increased consumption of computing power, network bandwidth, or energy may occur while carrying out certain special tasks. The operator of a node may then, for example, make the readiness for providing such resources dependent on at least a portion of the incurred costs being remunerated. As explained above, the conditional delegation reduces the tendency of remuneration systems to provide disincentives for centralization of the network. Thus, during operation of the network it is not necessary to avoid the utilization of remuneration systems in order to avoid a self-reinforcing centralization of the network.

In one particularly advantageous embodiment of the present invention, the donor node selects the recipient nodes from a subset that includes those nodes that have been selected for taking over the special task, and/or that have been made available for this purpose. The situation may thus be avoided that effort in the form of time and/or computing power is invested in the selection in particular of nodes in the proper subset of the nodes entrusted with the special task, which are not even able, willing, or allowed to take over this special task.

In one particularly advantageous embodiment of the present invention, the selection of the proper subset involves nominating at least one candidate subset of nodes. This ensures that this candidate subset is consistent with a utilization of the delegated portions, in which the same delegated portion at most is taken into account for a recipient node in the candidate subset. This may be verified based on a predefined candidate subset. If the candidate subset does not pass this test, it is discarded. However, the candidate subset may also be generated from the outset, provided that the same delegated portion for at most one recipient node is taken into account.

The candidate subset is assessed with a valuation number according to a freely selectable optimality criterion. A candidate subset is selected as a proper subset, based on the valuation number.

For example, the candidate subset with the best valuation number may be selected as the proper subset. In addition, for example a certain bandwidth of candidate subsets with similar valuation numbers may be placed on a "short list." Each candidate subset from this short list may then be selected, for example with a likelihood, weighted corresponding to the valuation number of the candidate subset, of being selected as the final proper subset.

Thus, of the possible candidate subsets, initially those candidate subsets are excluded that do not satisfy the restriction that a conditionally delegated weight portion may ultimately be taken into account in the proper subset for only one recipient node. Those candidate subsets that meet this condition are at least self-consistent with regard to the stated circular argument between acceptance into the proper subset and subsequent correction of conditionally delegated portions that are not taken into account. In order to thoroughly assess these candidate subsets, an arbitrary optimality criterion may be used in which the special features of the conditional delegation no longer have to be taken into account.

The tasks to be performed within the scope of the selection of the proper subset may be carried out by a central authority in the network, for example, but also, for example, may be arbitrarily distributed over the nodes in the network. For example, for some applications of the network it may be meaningful to accept candidate subsets from all nodes. In contrast, for other applications it may be meaningful to accept candidate subsets only from the nodes that at that moment belong to the proper subset. The computation of the valuation number and the selection of the candidate subset with the best valuation number may be carried out, for example, by further nodes and/or groups of nodes.

Arbitrary algorithms that are adapted to the situation may be used for nominating the candidate subset and the selection of the candidate subset based on the valuation number, for example with the best valuation number. In this way, predefined marginal conditions may be implemented, for example, by the specific application of the network. Thus, for example, for safety-relevant applications a so-called "minimal agency scheme" may be stipulated in order to limit the maximum possibility for influencing each individual node.

Program routines that are utilized in the process of selecting the proper subset may be implemented in particular in the form of so-called "smart contracts." These are programs that are executed, for example, on the nodes of a block chain (such as the nodes of the public Ethereum block chain), and once they are installed are publicly available there, but at the same time are no longer changeable. Not even the creator of a smart contract may subsequently change or delete them, if this option is not already provided in the original program code of the smart contract.

Alternatively or also in combination, program routines for selecting the proper subset may be designed in such a way that a deviation of the selection process from an established set of rules is at least recognized. For example, the same task may be assigned to multiple nodes, and the results may be checked against one another for plausibility by these nodes, or also by other nodes.

In one particularly advantageous embodiment of the present invention, at least one candidate subset is ascertained based on a candidate distribution of the utilization of the delegated portions by applying the predefined criterion for selecting the proper subset. When it is established which weight portions of which donor nodes are unconditionally or conditionally delegated to which recipient nodes, for each weight portion conditionally delegated to multiple recipient nodes there is still the degree of freedom concerning which recipient node of this weight portion ultimately benefits. The decisions in this regard for all multiple delegated weight portions may form the candidate distribution of the utilization of the delegated portions.

The optimality criterion may, for example, involve the total sum of all weights, provided that the proper subset is selected corresponding to the candidate subset. The candidate subset which as a whole obtains the greatest support from all nodes in the network is then preferably selected as the proper subset.

Alternatively or in combination, for this purpose the optimality criterion may, for example, involve a ratio of the sum of the portions unconditionally delegated to all nodes in the candidate subset to the sum of the portions unconditionally delegated to all nodes of the network. For example, a threshold value or some other setpoint value may be established for this ratio. It is thus possible in particular to take into account, for example, that in an unconditional delegation of a weight portion from a donor node to a recipient node, there is a stronger "commitment of support" of the donor node than in a conditional delegation. In the conditional delegation, the donor node still reserves alternatives; in the unconditional delegation, the recipient node has no alternatives from the viewpoint of the donor node.

In one further particularly advantageous embodiment of the present invention, the optimality criterion involves a comparison of the distribution of a predefined property across all nodes of the network to the distribution of this property across all nodes of the candidate subset. The distribution may relate to an arbitrary property that may be meaningfully associated with individual nodes. For example, the property may relate to the type of entity that operates the node (such as an individual, a company, or a public institution). For example, if diversity exists across all nodes in the network in such a way that nodes operated by individuals, by companies, and by public institutions complement one another in a certain percentage mix, this mix may then also be transferred into the proper subset of the nodes to be formed which take over the special tasks.

In one further particularly advantageous embodiment of the present invention, new candidate subsets of nodes are nominated until their valuation number meets a predefined criterion, or until a predefined allotment of effort for selecting the proper subset is exhausted, whichever occurs first. The effort may be predefined or measured, for example, in time and/or in computing steps, or also in any other quantitative measure. Since candidate subsets are initially checked for the mentioned self-consistency, and are further assessed for content only after passing this check, it is difficult to predict in advance how rapidly the search for the optimal proper subset converges overall. By limiting the effort, it may be ensured that in any case, at a desired point in time a proper subset of nodes that performs the special tasks is available. Thus, for example, during operation of block chains there are frequently specifications concerning the particular cycle of the block chain in which new blocks are to be added, for example to ensure a sufficient throughput for transactions in a cryptocurrency to be stored in the block chain.

In one further particularly advantageous embodiment of the present invention, the weight that is assigned to each node in the network corresponds to a quantity portion of at least one resource. The node is authorized for disposition via this quantity portion, and with such guarantees a faultless execution of the special task. In this way, in particular donor nodes that conditionally or unconditionally delegate the weight portions to recipient nodes document trust that they have in the recipient nodes.

The resource may be managed, for example, by the network itself. However, the resource may generally also be, for example, a resource for which the network is able to check and/or control the disposition authorization of nodes on this resource. For example, the resource may include money in a cryptocurrency that is managed by some other block chain. The network may exert control over this resource via a smart contract, for example, which it places on this other block chain (such as the Ethereum block chain).

The guarantee of a faultless execution may in particular mean, for example, that in response to the establishment that a node in the proper subset has not or has not properly executed its part of the special task, quantity portions of the resource, which correspond to the weight of this node, including the portions delegated to this node as recipient node, are completely or partially withdrawn from the access of this node, and/or the access of donor nodes delegating portions to this node.

In other words, if the condition that is secured by the quantity portions as a deposit is not redeemed, the deposit is due. For securing the deposit, for example in particular the quantity portions of the resource that correspond to the weights of the nodes in the proper subset, including the portions delegated to these nodes as recipient nodes, may be kept blocked.

In this regard, the resource with which the weight portions are stored is preferably a resource that each node has a great interest in. When transactions in a cryptocurrency, for example, are stored in the block chain, the resource may then correspond, for example, to a monetary amount in this cryptocurrency.

Statements of the type that affect node decisions, involve incentives, or track interests are used solely for better understanding, based on analogs in human decision processes. However, they are not to be construed such that the nodes have to be controlled, at least in part, by humans. The nodes in the network operate autonomously, and their particular operator may provide them with general guidelines. In particular the autonomous, automated operation of the nodes gives rise to the self-reinforcing centralization effects, which the method described here counteracts. This is analogous to some extent to the automated high frequency trading in stock markets, in which the interaction of nominally independent, autonomous agents results in self-reinforcing effects that affect the system as a whole.

In one further particularly advantageous embodiment of the present invention, the special task involves at least one part for implementing and/or coordinating at least one change of a protocol that is used for exchanging information within the network and/or with querying client stations, and/or for carrying out tasks, and/or some other set of rules that is predefined for the network. This also involves tasks that are advantageously entrusted to a limited committee of nodes corresponding to the proper subset, due to the fact that simultaneous participation of all nodes that are present is rather cumbersome. A set of rules may contain principles on a "metalevel," for example, concerning how changes of protocols in the network are to be coordinated. A protocol may then in turn contain, for example, specifications concerning the appearance of blocks of a block chain. A coordination process within the network may then, for example, be directed toward increasing the maximum block size due to the fact that the occurrence of information (such as transactions) to be stored in the blocks is high, and the block size at that moment always results in bottlenecks. When a coordination can be carried out within the network, it is possible to avoid a "hard fork," i.e., a split of the block chain into two block chains due to disagreement between certain groups of participants that cannot be resolved. In the past, such hard forks existed in the bitcoin block chain, for example, so that in addition to the original bitcoins there is also now "bitcoin cash" and "bitcoin gold."

In one further particularly advantageous embodiment of the present invention, the special task involves at least one part for reselecting the proper subset of the nodes. As explained above, in the sense of the availability and the security of the network it is advantageous for those nodes that perform the special tasks in the network to be regularly changed. Thus, such a change is not tantamount to withdrawing trust from the nodes which thus far have performed the special tasks. Rather, the new selection is made specifically by those nodes in which trust has previously been explicitly expressed.

Since the nodes are computer-implemented and the network is a combination of the nodes, the method in accordance with the present invention may in particular also be embodied in software that runs on the nodes. Therefore, the present invention further relates to a computer program that includes machine-readable instructions which, when executed on one or multiple computers, prompt the computer(s) to carry out one of the described methods. In this sense, control units for vehicles and embedded systems for technical devices which are likewise capable of carrying out machine-readable instructions are to be regarded as computers.

Moreover, the present invention relates to a machine-readable data medium and/or a download product that includes the parameter set and/or the computer program. A download product is a digital product that is transmittable via a data network, i.e., downloadable by a user of the data network, and that may be offered for sale in an online store, for example, for immediate download.

In addition, in accordance with the present invention, a computer may be equipped with the computer program, the machine-readable data medium, or the download product.

Further measures that enhance the present invention are described in greater detail below with reference to figures, together with the description of the preferred exemplary embodiments of the present invention.

DETAILED DESCRIPTION OF EXAMPLE EMBODIMENTS

Figure 1:
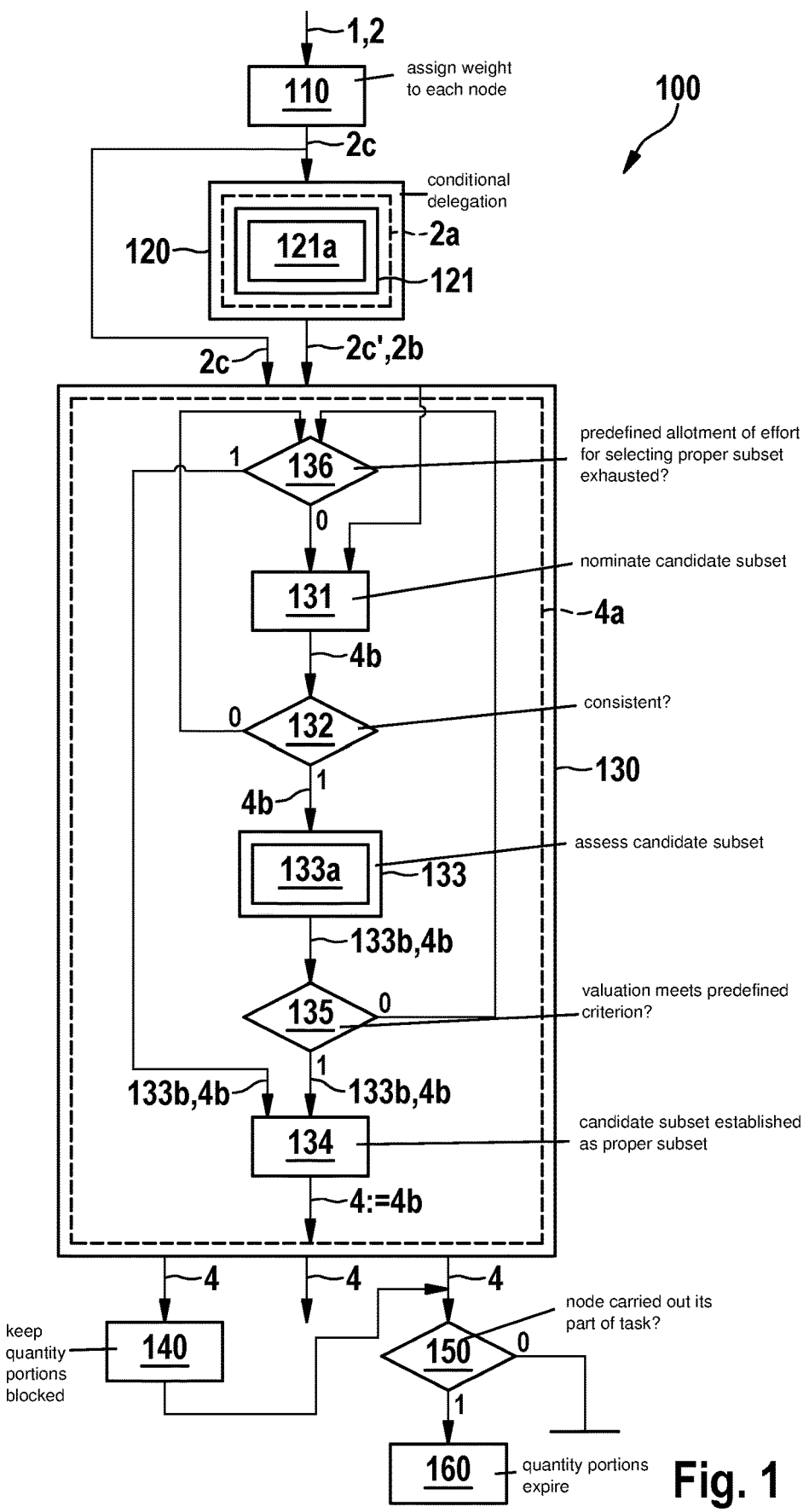
FIG. 1 shows one exemplary embodiment of method 100 in accordance with the present invention.

FIG. 1 is a flow chart of one exemplary embodiment of method 100. Method 100 assumes that a network 1 that includes a plurality of nodes 2 is present. A proper subset 4 of these nodes 2 carries out at least one special task that influences the operation of network 1 as a whole.

A weight 2c is assigned to each node 2 in step 110. Each node 2 obtains the option as a donor node 2a to conditionally or unconditionally delegate portions 2c' of its weight 2c to recipient nodes 2b in step 120. Based on weight 2c of each node 2, plus portions 2c' delegated to it as a recipient node 2b and minus portions 2c' delegated by it as a donor node 2a to other recipient nodes 2b, proper subset 4 of nodes 2 to which the at least one special task is assigned is selected, based on a predefined criterion 4a, in step 130.

The manner in which the conditional delegation takes place is illustrated within box 120. At least a portion 2c' is conditionally delegated by a donor node 2a to at least two recipient nodes 2b according to block 121, under the suspending condition that particular recipient node 2b does not belong to proper subset 4 after selection 130. Additional limitation 121a applies that the same portion 2c' that is conditionally delegated to multiple recipient nodes 2b may be taken into account at most upon acceptance of one of these recipient nodes 2b into proper subset 4.

Examples of criteria 4a are illustrated within box 130, on the basis of which proper subset 4 may be selected, based on weights 2c and delegated portions 2c'.

At least one candidate subset 4b of nodes 2 is nominated according to block 131. Upon nomination of the candidate subset or by subsequent checking, it is ensured according to block 132 that candidate subset 4b is consistent with a utilization of delegated portions 2c', in which the same portion 2c' at most is taken into account for a recipient node 2b in candidate subset 4b. If a check shows that this is not the case (truth value 0), limitation 121a is violated, and candidate subset 4b cannot be used. The method branches back to nominate 131 a new candidate subset 4b. In contrast, if limitation 121a is met (truth value 1 in block 132), candidate subset 4b is assessed with a valuation number 133b according to an optimality criterion 133a.

If valuation number 133b meets criterion 135 (truth value 1), candidate subset 4b is established according to block 134 as a proper subset 4 of nodes 2 that carry out special tasks in network 1. In contrast, if valuation number 133b does not meet criterion 135 (truth value 0), the method branches back to nominate 131 a new candidate subset 4b.

However, according to block 136 a check is made beforehand as to whether a predefined allotment of effort for selecting proper subset 4 is already exhausted. If this is the case (truth value 1), the method makes a preliminary branch to block 134, and candidate subset 4b is established as proper subset 4, using valuation number 133b that is best up to this point in time. The check according to block 136 takes place even if the method branches back from block 132 to block 131.

Quantity portions of a resource of network 1 (such as monetary amounts in cryptocurrency) that correspond to weights 2c of nodes 2 in proper subset 4, including portions 2c' delegated to these nodes 2 as recipient nodes 2b, may be kept blocked according to step 140, and thus secured as deposit for proper execution of the at least one special task.

In response to establishment 150 that a node 2 in proper subset 4 has not or has not properly carried out its part of the special task, according to step 160 quantity portions of the resource that correspond to weight 2c of this node 2, including portions 2c' delegated to these nodes 2 as recipient nodes 2b, expire.

Figure 2:
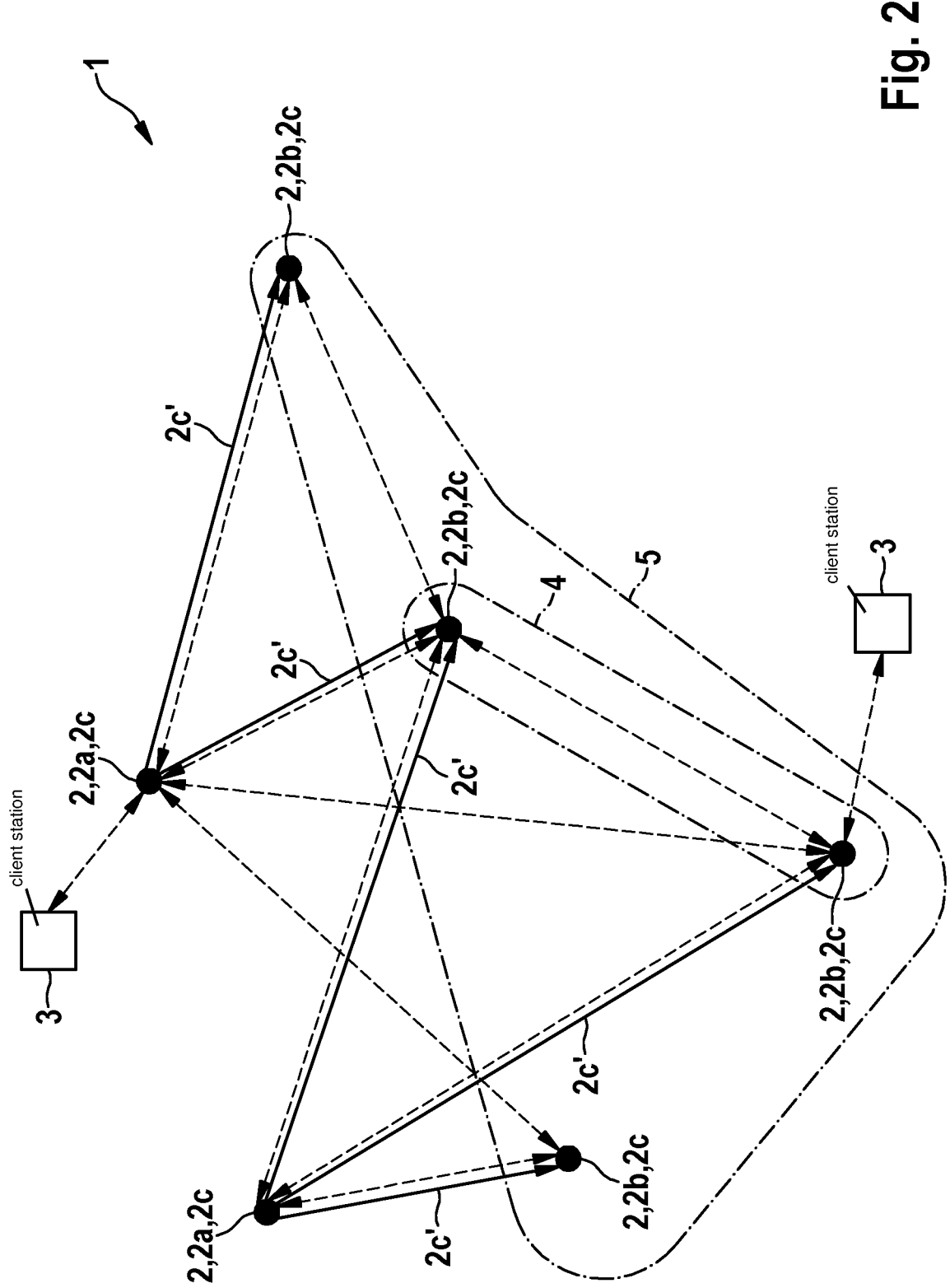
FIG. 2 shows a greatly simplified example of a network 1 in which method 100 is usable in accordance with the present invention.

FIG. 2 shows a greatly simplified example of a network 1 in which method 100 is usable. Nodes 2 exchange information with one another and with client stations 3 along the bidirectional paths depicted by dashed lines. Network 1 as a whole provides at least one service for client stations 3, such as the management of a block chain for transactions in a cryptocurrency.

A weight 2c is assigned to each of nodes 2. Some nodes 2 function as donor nodes 2a and delegate portions 2c' of their weight 2c to recipient nodes 2b, it being possible for the same portion 2c' to be delegated by a donor node 2a to multiple recipient nodes 2b. Based on weights 2c, including delegated portions 2c', a proper subset 4 of nodes 2 for carrying out special tasks in network 1 is selected.

Recipient nodes 2b may be selected, for example, from a subset 5 of nodes 2 of the network, which are generally available for carrying out special tasks.

What is claimed is:

1. A method for operating a network made up of a plurality of computer-implemented nodes, the nodes distributing information in the network among one another and exchanging information with querying client stations, and a proper subset of the nodes carrying out at least one special task that influences operation of the network, the method comprising the following steps: assigning a weight to each of the nodes in the network, each of the nodes having an option as a donor node to conditionally or unconditionally delegate portions of its weight to other recipient nodes;

and selecting the proper subset to which the at least one special task is assigned, the selecting being based on the weight of each node of the nodes, plus portions delegated to the node as a recipient node and minus portions delegated by the node as a donor node to other recipient nodes, and based on at least one predefined criterion; wherein at least a portion the weight of one of the nodes as a donor node is delegated to each of at least two recipient nodes, under a suspending condition that the recipient node does not belong to the proper subset after the selection, and with an additional limitation that a same portion of the weight of the one of the nodes as a donor node that is conditionally delegated to multiple recipient nodes is taken into account at most upon acceptance of one of the recipient nodes into the proper subset.

2. The method as recited in claim 1, wherein the one of the nodes as a donor node selects the recipient nodes from a subset that includes those nodes that have been selected for taking over the special task, and/or that have been made available for taking over the special task.

3. The method as recited in claim 1, wherein the selection of the proper subset includes:
nominating at least one candidate subset of the nodes;
ensuring that the candidate subset is consistent with a utilization of delegated portions, in which the same delegated portion at most is taken into account for one of the recipient nodes in the candidate subset;
assessing the candidate subset with a valuation number according to an optimality criterion; and
selecting the candidate subset as the proper subset, based on the valuation number.

4. The method as recited in claim 3, wherein the optimality criterion includes a total sum of all weights, provided that the proper subset is selected corresponding to the candidate subset.

5. The method as recited in claim 3, wherein the optimality criterion includes a ratio of a sum of portions unconditionally delegated to all nodes in the candidate subset to a sum of portions unconditionally delegated to all nodes of the network.

6. The method as recited in claim 3, wherein the optimality criterion includes a comparison of a distribution of a predefined property across all nodes of the network to a distribution of the predefined property across all nodes of the candidate subset.

7. The method as recited in claim 3, wherein new candidate subsets of nodes are nominated: (i) until their valuation number meets a predefined criterion, or (ii) until a predefined allotment of effort, measured in time, or measured in computing steps, or measured in another quantitative measure, for selecting the proper subset is exhausted, whichever occurs first.

8. The method as recited in claim 3, wherein at least one candidate subset is ascertained based on a candidate distribution of utilization of delegated portions by applying the predefined criterion.

9. The method as recited in claim 1, wherein the weight that is assigned to each of the nodes in the network corresponds to a quantity portion of at least one resource, via which the node is authorized for disposition, and with which the node guarantees a faultless execution of the special task.

10. The method as recited in claim 9, wherein the quantity portions of the resource that correspond to the weights of the nodes in the proper subset, including portions delegated to the nodes in the proper subset as recipient nodes, are kept blocked.

11. The method as recited in claim 9, wherein in response to establishing that a node in the proper subset has not executed its part of the special task or has not properly executed its part of the special task, the quantity portions of the resource, which correspond to the weight of the node in the proper subset, including portions delegated to the node of the proper subset as a recipient node, are completely or partially withdrawn from access of the node in the proper subset, and/or from access of donor nodes delegating portions to the node in the proper subset.

12. The method as recited in claim 1, wherein the special task includes at least one part for: (i) creating a new block that is pending for addition to a block chain that is managed by the network, and/or (ii) checking the information contained in the new block for correctness with regard to a set of rules that is predefined for the block chain, and/or (iii) adding the new block to the block chain when the checking has a positive outcome.

13. The method as recited in claim 12, wherein the information in the new block that is pending for the addition to the block chain includes transactions in at least one cryptocurrency and/or at least one item to be authenticated.

14. The method as recited in claim 1, wherein the special task includes at least one part for implementing and/or coordinating at least one change of a protocol that is used: (i) for exchanging information within the network, and/or (ii) for querying client stations, and/or (iii) for carrying out tasks, and/or with some other set of rules that is predefined for the network.

15. The method as recited in claim 1, wherein the special task includes at least one part for reselecting the proper subset of the nodes.

16. A non-transitory machine-readable data medium on which is stored a computer program for operating a network made up of a plurality of computer-implemented nodes, the nodes distributing information in the network among one another and exchanging information with querying client stations, and a proper subset of the nodes carrying out at least one special task that influences operation of the network, the computer program, when executed by one or more computers, causing the one or more computers to perform the following steps: assigning a weight to each of the nodes in the network, each of the nodes having an option as a donor node to conditionally or unconditionally delegate portions of its weight to other recipient nodes; and selecting the proper subset to which the at least one special task is assigned, the selecting being based on the weight of each node of the nodes, plus portions delegated to the node as a recipient node and minus portions delegated by the node as a donor node to other recipient nodes, and based on at least one predefined criterion; wherein at least a portion the weight of one of the nodes as a donor node is delegated to each of at least two recipient nodes, under a suspending condition that the recipient node does not belong to the proper subset after the selection, and with an additional limitation that a same portion of the weight of the one of the nodes as a donor node that is conditionally delegated to multiple recipient nodes is taken into account at most upon acceptance of one of the recipient nodes into the proper subset.

17. A computer configured to operate a network made up of a plurality of computer-implemented nodes, the nodes distributing information in the network among one another and exchanging information with querying client stations, and a proper subset of the nodes carrying out at least one special task that influences operation of the network, the computer configured to: assign a weight to each of the nodes in the network, each of the nodes having an option as a donor node to conditionally or unconditionally delegate portions of its weight to other recipient nodes; and select the proper subset to which the at least one special task is assigned, the selecting being based on the weight of each node of the nodes, plus portions delegated to the node as a recipient node and minus portions delegated by the node as a donor node to other recipient nodes, and based on at least one predefined criterion; wherein at least a portion the weight of one of the nodes as a donor node is delegated to each of at least two recipient nodes, under a suspending condition that the recipient node does not belong to the proper subset after the selection, and with an additional limitation that a same portion of the weight of the one of the nodes as a donor node that is conditionally delegated to multiple recipient nodes is taken into account at most upon acceptance of one of the recipient nodes into the proper subset.

\* \* \* \* \*